United States Patent
Bonola (10) Patent No.: US 6,466,993 B1
(45) Date of Patent: Oct. 15, 2002

(54) METHOD AND APPARATUS FOR PERFORMING TRANSACTIONS RENDERING BETWEEN HOST PROCESSORS AND I/O DEVICES USING CONCURRENT NON-BLOCKING QUEUING TECHNIQUES AND I/O BUS WRITE OPERATIONS

(75) Inventor: Thomas J. Bonola, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/186,540

(22) Filed: Nov. 5, 1998

(51) Int. Cl.$^7$ .............................................. G06F 3/00
(52) U.S. Cl. ........................ 710/1; 710/20; 710/52; 710/310
(58) Field of Search ................... 710/128, 129, 710/126, 20, 21, 39, 52, 53, 56, 305, 306, 310, 1, 7

(56) References Cited

U.S. PATENT DOCUMENTS

| | | | | |
|---|---|---|---|---|
| 5,721,839 A | * | 2/1998 | Callison et al. | 710/128 |
| 5,765,196 A | * | 6/1998 | Liencres et al. | 711/143 |
| 5,828,835 A | * | 10/1998 | Isfeld et al. | 709/200 |
| 5,860,149 A | * | 1/1999 | Fiacco et al. | 711/209 |
| 6,032,267 A | * | 2/2000 | Fishler et al. | 714/11 |
| 6,065,085 A | * | 5/2000 | Odenwald, Jr. et al. | 710/129 |
| 6,092,071 A | * | 7/2000 | Bolan et al. | 707/101 |
| 6,105,080 A | * | 8/2000 | Holt et al. | 710/26 |
| 6,266,731 B1 | * | 7/2001 | Riley et al. | 710/129 |

OTHER PUBLICATIONS

"HP Demonstrates Commitment to I2O Standard With New I2O Disk–array Controller"; Hewlett Packard; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

Michael, Maged M. and Scott, Michael L.; "Simple, Fast, and Practical Non–Blocking and Blocking Concurrent Queue Algorithms"; 9 pages.

Michael, Maged M. and Scott, Michael L.; "Relative Performance of Preemption–Safe Locking and Non–Blocking Synchronization on Multiprogrammed Shared Memory Multiprocessors"; 7 pages.

Michael, Maged M. and Scott, Michael L.; "Non–Blocking Algorithms and Preemption–Safe Locking on Multiprogrammed Shared Memory Multiprocessors"; Mar. 1997; 35 pages.

(List continued on next page.)

Primary Examiner—Peter Wong
Assistant Examiner—X. Chung-Trans
(74) Attorney, Agent, or Firm—Fletcher, Yoder & Van Someren (57) ABSTRACT

In a computer system including one or more hosts coupled via a host bus to each other and a cached host memory, an Input/Output processor providing data to peripheral devices and an I/O bus disposed between the hosts and the Input/Output processor for transfer of information therebetween, an inbound queue structure receives message information from one of the hosts, and an outbound queue structure sends message information from the I/O processor to one of the hosts. Each of the queue structures comprises a pair designated as a free-list buffer and a post-list buffer. The free-list buffer of the inbound queue structure and the post-list buffer of the outbound queue structure are locally coupled to the hosts so that message information transfers between these two buffers and the hosts without incurring I/O bus read operations.

16 Claims, 13 Drawing Sheets

OTHER PUBLICATIONS

"Welcome to the I2O SIG® Web Site!"; http://www.i2osig.org; Feb. 6, 1998.

"About I2O Technology"; http://www.i2osig.org/Architecture; Feb. 6, 1998.

"Technology Backgrounder"; http://www.i2osig.org/Architecture/TechBack.html; Feb. 6, 1998; 6 pages.

"Questions and Answers"; http://www.i2osig.org/Architecture/QandA.html; Feb. 6, 1998; 4 pages.

"I2O®Specifications For Non–Members"; http://www.i2osig.org/Architecture/GetSpec.html; Feb. 6, 1998.

Amdahl, Carlton G.; "I2O Future Directions"; http://www.i2osig.org; Jun. 1996; 12 papes.

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases; http://altavista.digital.com/cgi–bin/quer...=21%2FMar%2F86&dl=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

Mendel, Brett; "Server I/O all set to flow"; *Lantimes*, Oct. 27, 1997, vol. 14, Issue 22; cover page and p. 31.

Briggs, Chris; "Smarter and Faster I/O for Servers"; Operating Systems; *Byte*, May 1; 1996, vol. 2, No. 5.

Thompson, Tom; "I2O Beats I/O Bottlenecks"; *Byte*, Aug. 1997, pp. 85, 86 and 3 additional pages.

I2O Introduction; Technology Backgrounder; Aug. 13, 1997; http://www.i2osig.org/Architecture/TechBack.html.

i960®RP I/O Processor—the I2O SIG site; http://134.134.214.1/design/iio/i20sig.html; Feb. 6, 1998.

* cited by examiner

METHOD AND APPARATUS FOR PERFORMING TRANSACTIONS RENDERING BETWEEN HOST PROCESSORS AND I/O DEVICES USING CONCURRENT NON-BLOCKING QUEUING TECHNIQUES AND I/O BUS WRITE OPERATIONS

CROSS-REFERENCE TO RELATED APPLICATIONS

This Application relates to the application entitled: METHOD AND APPARATUS FOR SELECTIVELY INCREMENTING COUNT NUMBERS ASSOCIATED WITH NODE ADDRESSES IN CONCURRENT NON-BLOCKING QUEUES, Thomas J. Bonola inventor U.S. application Ser. No. 09/173,438 now U.S. Pat. No. 6,178,473 filed Oct. 15, 1998, which is incorporated herein by reference.

BACKGROUND OF THE INVENTION

1. Field of the Invention

The present invention relates to computer systems with input-output (I/O) architectures, and more particularly, and not by way of limitation, to an $I_2O$ compliant computer system that utilizes concurrent non-blocking queuing techniques to perform transaction rendering between host processors and I/O devices using I/O bus write operations.

2. Description of Related Art

In an $I_2O$ compliant computer system, a special I/O architecture is used to facilitate portability between operating systems and host platforms. Because the teachings of the present invention may be better described in relation to the $I_2O$ architecture, a brief overview thereof is provided hereinbelow.

Essentially, the $I_2O$ architecture uses a "split driver" model which inserts a messaging layer between the portion of the device driver specific to the operating system and the portion of the device driver specific to the peripheral device.

The messaging layer splits the single device driver of today into two separate modules—an Operating System Service Module (OSM) and a Downloadable Driver Module (DDM). The only interaction one module has with another module is through this messaging layer which provides a communication path.

The OSM comprises the portion of the device driver that is specific to the operating system. The OSM interfaces with the operating system of the computer system (which may also be referred to in the art as the "host operating system") and is executed by the host CPU or processor. Typically, a single OSM may be used to service a specific class of peripherals or adapters. For example, one OSM would be used to service all block storage devices, such as hard disk drives and CD-ROM drives.

The DDM provides the peripheral-specific portion of the device driver that understands how to interface to the particular peripheral hardware. To execute the DDM, an $I_2O$ Input/Output Processor (IOP) is added to the computer system. A single IOP may be associated with multiple peripherals, each controlled by a particular DDM, and containing its own operating system such as, for example, the $I_2O$ Real-Time Operating System (iRTOS). The DDM directly controls the peripheral, and is executed by the IOP under the management of the iRTOS.

Those skilled in the art will recognize that a DDM may typically comprise a Hardware Device Module (HDM) that directly interfaces with the peripheral and is responsible for its control and data transfer associated therewith. DDMs can also comprise an Intermediate Service Module (ISM) which is an additional software interface to the HDM. The ISM is often used for filtering, encoding, and decoding messages to the HDM.

In general operation, the communication model used in the $I_2O$ architecture is a message passing system. When the CPU seeks to read or write to an adapter or peripheral in an $I_2O$ system, the host operating system makes what is known as a "request". The OSM translates the request by the host operating system and, in turn, generates a message. The OSM sends the message across the messaging layer to the DDM associated with the peripheral which processes it appropriately to achieve a result. Upon completion of the processing, the DDM sends the result back to the OSM by sending an appropriate message through the messaging layer. It can be appreciated that to the host operating system, the OSM appears just like any other device driver.

By executing the DDM on the IOP, the time-consuming portion of transferring information from and to the peripheral hardware is off-loaded from the CPU to the IOP. With this off-loading, the CPU is no longer diverted for inordinate amounts of time during an I/O transaction. Moreover, because the IOP is a hardware component essentially dedicated to the processing of the I/O transactions, the problem of I/O bottlenecks is mitigated.

The $I_2O$ architecture also significantly reduces the number of device drivers written on the basis of the split driver model. Typically, peripheral device manufacturers need only write a single DDM for a particular peripheral which can now operate with any host operating system. The vendors of the host operating system need only write one OSM for each class of peripherals, e.g., the network controller class.

As described in the foregoing, the communication model, that is, the message passing system, utilized in $I_2O$ systems is designed to be operable with a compatible messaging hardware interface for communication between the host and the IOP. One of the common implementations of this interface involves a two-way queuing system supplied by the IOP—an inbound queue to receive messages from the host and other remote IOPs, and an outbound queue to pass messages to the host.

A set of concurrent non-blocking methods which demonstrate superior performance over traditional spinlock methods of multiprocessor synchronization have been developed by Maged M. Michael and Michael L. Scott. These methods allow multiple processors to gain concurrent non-blocking access to shared First In First Out (FIFO) queues with immunity from inopportune preemption and are especially useful for parallel software applications requiring shared access to FIFO queues. Furthermore, these methods demonstrate nearly linear scalability under high contention of critical regions in a multiprocessor environment and are incorporated directly in application software. These methods do not affect processor interrupts and do not require spinlock methods to provide mutual exclusion to a shared critical region.

Under the current $I_2O$ method, the IOP Controller is disposed on the side of the I/O bus opposite from the Host's perspective. Thus, when a Host wants to render a transaction to the IOP Controller, the Host must first "read" from the inbound free queue, i.e., a list of free addresses local to the IOP, to obtain a message frame address that corresponds to one of the blocks in the IOP Controller's local memory. This requires that the host initiate a "read" over the I/O bus to access the queue located on the same side of the I/O bus as the IOP Controller.

However, in order for a "read" to go through the I/O bus, the write post buffers of the I/O bus must first be drained before the "read" can occur. This is necessary, in order to preserve coherency and consistency. Typically, an I/O bus, e.g., a PCI (Peripheral Component Interconnect) bus, has a predetermined number of write post buffers and a Host CPU releases data to these write post buffers thus freeing the CPU to perform other tasks. In the situation where there is a lot of write activity over the PCI bus (e.g, a master writing in a memory or a CPU writing down to a device), writes are posted to the I/O bus and if a read comes through that bus for any reason, the read may experience high latency waiting for the write post buffers to drain before the read goes through. This problem can occur in either direction. Thus, to overcome this problem, a technique would be desirable to complete transactions between host processors and I/O Devices without incurring I/O Bus Read operations and utilizing concurrent non-blocking queuing techniques.

SUMMARY OF THE INVENTION

The present invention comprises a method and apparatus for rendering and completing transactions between host processors and the IOP controller without incurring read operations over the I/O bus while utilizing concurrent non-blocking queuing techniques.

In accordance with the present invention, a computer system includes one or more hosts coupled via a host bus to each other and a cached host memory, an Input/Output processor providing data to peripheral devices, and an I/O bus (preferably a PCI bus) disposed between the hosts and the Input/Output processor for transfer of information therebetween. An inbound queue structure receives message information from one of the hosts, and an outbound queue structure sends message information from the I/O processor to one of the hosts. Each of the queue structures comprises a pair of FIFOs designated as a free-list buffer and a post-list buffer. The free-list buffer of the inbound queue structure and the post-list buffer of the outbound queue structure are locally coupled to the hosts so that message information transfers between these two buffers and the hosts without incurring I/O bus read operations.

In a further aspect of the present invention, the computer system includes a host bus. The free-list buffer of the inbound queue structure and the post-list buffer of the outbound queue structure are locally coupled to the host via the host bus.

In another aspect of the present invention, the computer system includes a cached host memory coupled to the host. The free-list buffer of the inbound queue structure and the post-list buffer of the outbound queue structure are in the cached host memory.

In still another aspect of the present invention, the inbound queue structure and the outbound queue structure are adapted for use in an Intelligent Input/Output (I$_2$O) environment.

In another aspect of the present invention, the buffers of the input queue structure and the buffers of the outbound queue structure are concurrent and non-blocking.

In another aspect of the present invention, a method for inbound transfer of information transfers information from one of the hosts to one of the peripheral devices. One of the hosts reads an inbound message frame address from the inbound free buffer over the host bus. The inbound free-list buffer and the outbound post-list buffer may be maintained within the main memory. The host renders the data over the I/O bus to the message frame location of IOP memory corresponding the inbound message frame address. The host writes the message frame address to the inbound post-list buffer over the I/O bus. The Input/Output processor then reads the message frame address from the inbound post-list buffer. The Input/Output processor then transfers data corresponding to the message frame address to peripheral devices associated with the Input/Output Processor. After the transfer of data, the Input/Output Processor writes the message frame address to the inbound free-list buffer over the I/O bus.

In yet another aspect of the present invention, a method for outbound transfer of information transfers information from the I/O processor to one of the hosts. The Input/Output processor reads a message frame address from the outbound free-list buffer. The Input/Output processor renders data over the I/O bus to the location of the cached host memory corresponding the message frame address. The Input/Output processor writes the message frame address to the outbound post-list buffer over the I/O bus. The host reads the message frame address from the outbound post-list buffer over the local host bus. The host then processes the data of the message frame corresponding to the message frame address. The host then writes the message frame address back onto to the outbound free buffer over the I/O bus.

Thus, in the above-described embodiments of the present invention, eliminating "reads" from the I/O bus is achieved.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE INVENTION

Figure 1:
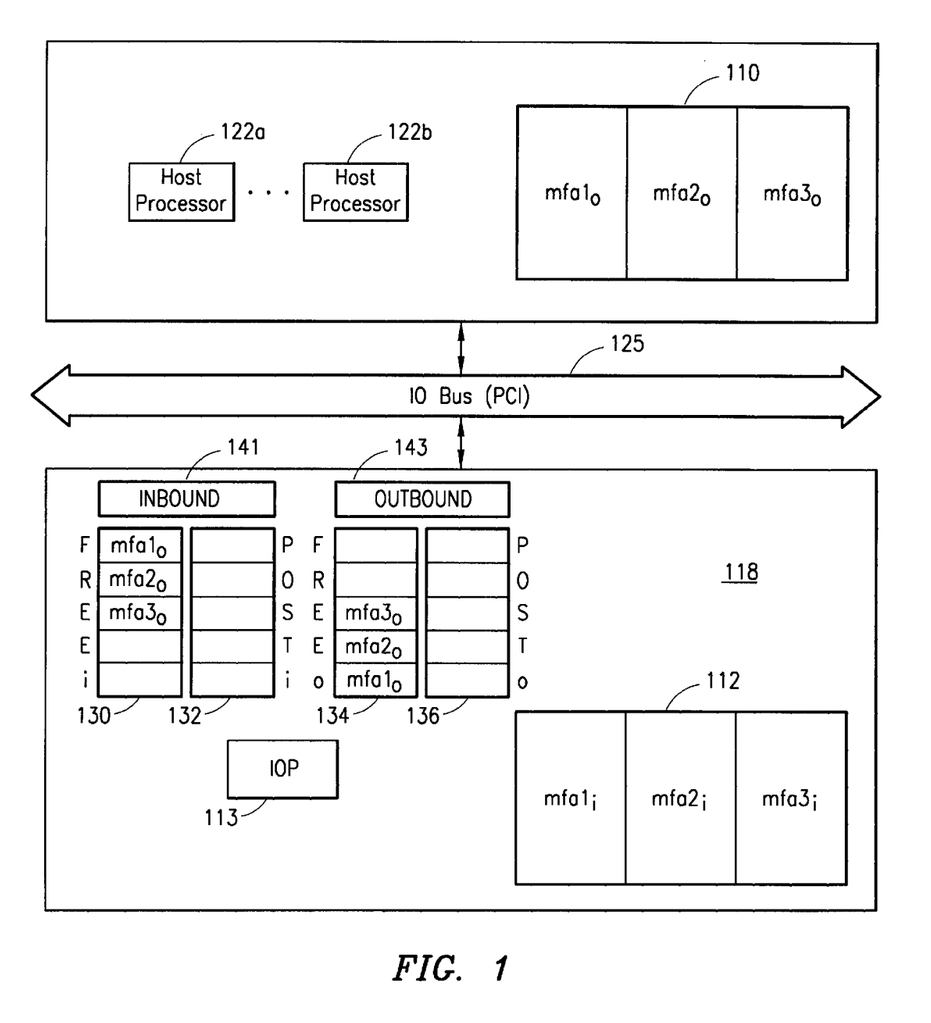
FIG. 1 is a block diagram showing the initial state of an IOP controller.
Figure 1A:
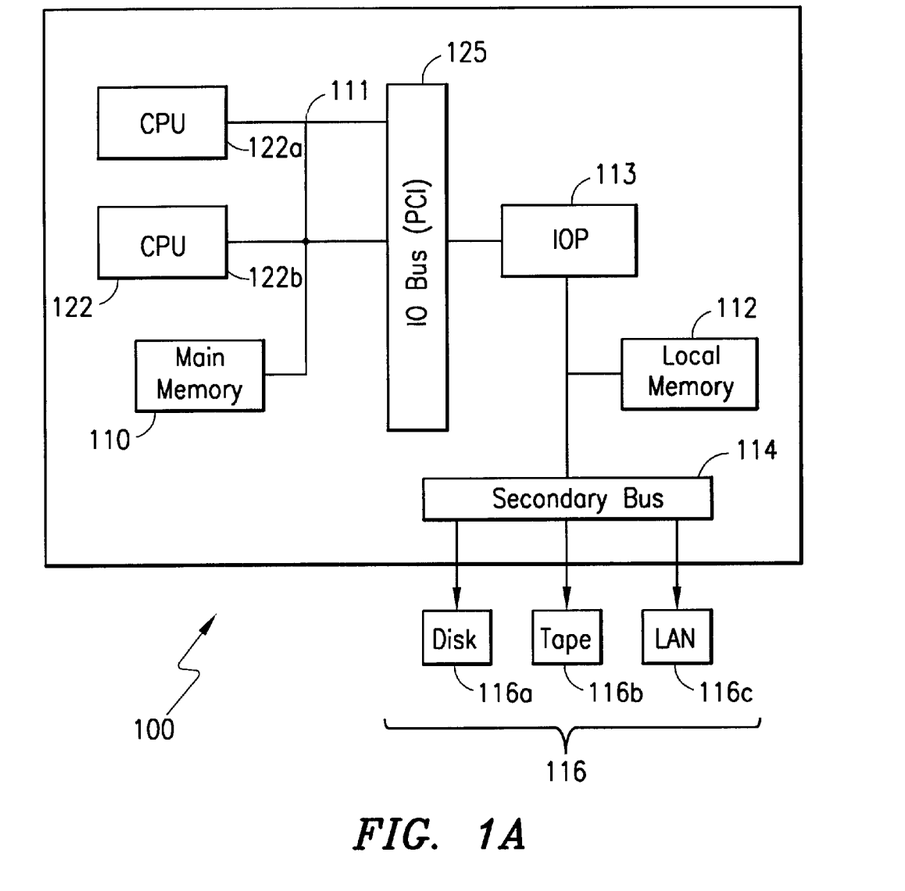
FIG. 1A is a block diagram of a computer system having an exemplary I$_2$O architecture.

In FIG. 1A, a block diagram of an exemplary embodiment of a computer system 100 is depicted with an I$_2$O architecture. The computer system 100 comprises one or more host processors or CPUs 122, for example host 122a and host 122b, and a main memory 110, all of which components may be disposed on a host bus 111. An Input/Output Processor (IOP) 113 may be coupled to one or more peripherals 116 via a secondary PCI bus 114. A memory 112 local to the IOP stores data being transferred to and from the peripherals 116. A system Input/Output bus 125, preferably a PCI bus, disposed between the host processors 122 and the IOP 113 provides control and data transfer associated therewith.

FIGS. 1–11 illustrates the current method of rendering and completing a transaction of data from a host computer to the IOP controller (Inbound operation) and from the IOP controller to the host computer (Outbound operation). To illustrate the method, a schematic, as for example, illustrated in FIG. 1 shows an $I_2O$ computer system 100 including one or more computer hosts 122 sharing a cached host memory 110, an I/O PCI Bus 125, and an IOP Controller 118. The IOP Controller 118 includes an IOP processor 113, an IOP memory 112, a pair 141 of inbound queues 130, 132, and a pair 143 of outbound queues 134, 136. The cached host memory 110 is divided into one or more message frames. Message frames mfa10, mfa20, mfa30 are shown in FIG. 1. The IOP Memory 112 is also divided into one or more message frames. Message frames mfa1i, mfa2i, mfa3i are shown in FIG. 1.

The default message transport mechanism provided with the attached IOP typically involves messages that reside in a shared memory structure called the message frame. A message frame is indicated by its message frame address (MFA) which specifies the first byte of the message frame header. For message frames located in the IOP's shared memory, the MFA is actually the offset between the start of the target IOP's (that is, the attached IOP's) shared memory and the start of the message. For messages frames located in host memory, the MFA is typically the physical address of the message itself. Messages are preferably passed by indicating the frame's MFA to the target messenger instance (IOP 113 or host 122).

The IOP Controller 118 includes an inbound message structure 141 to receive messages from one of the hosts 122 and an outbound message structure 143 to pass messages to one of the hosts 122. The inbound message structure 141 may be implemented as a pair of hardware first-in-first-out (FIFO) structures, called free-list 130 and post-list 132, respectively, for allocating and posting messages to the IOP 113. The outbound message structure 143 may also be implemented as a second pair of FIFOs for messages to be sent from the IOP 113 to one of the hosts 122. Conventionally, "inbound" and "outbound" are defined with respect to the IOP.

As can be appreciated by those skilled in the art, a FIFO may be conceptualized essentially as a buffer with two interfaces. One interface is used for filling the buffer with information whereas the other is used for draining or retrieving information therefrom. In general, message frames may be placed in a FIFO in any order. The free-list FIFO holds empty message frames and the post-list FIFO holds active message frames. A sender (or, message producer) draws an empty frame from the "bottom" of the free-list and posts it, after "filling" it with pertinent information, to the "top" of the post-list FIFO. A recipient (or, message consumer) draws an active frame from the "bottom" of the post-list FIFO and releases it, after retrieving the information, by posting it to the "top" of the free-list FIFO.

It can be seen that for the inbound message structure, the hosts 122 are the message producers and the IOP 113 is the message consumer. The hosts 122 are not required to post message frames in the same order they are allocated. Analogously, for the outbound message structure 143, the local IOP 113 is the message producer and the hosts 122 are the message consumer. Typically, the host is not required to release message frames in the same order they are received.

The local IOP 113 typically initializes its inbound queue by creating a number of message frames in its shared memory and placing the MFA of each message frame in the inbound free-list FIFO. Also, in general, message frames start on a 32-bit boundary. While it is possible to place all of the MFAs in either the free-list FIFO or the post-list FIFO, the total number of message frames created for a queue must be less than the size of either FIFO in order to prevent overflow. The hosts 122 use this interface to initialize the IOP's outbound queue. The host builds a number of message frames in host memory and posts them to the free-list by writing their MFAs to the outbound FIFO.

Referring to FIGS. 1–6, the inbound transfer of data from hosts 122 to the IOP 113 is now explained.

FIG. 1 illustrates the initial state of the IOP Controller 118. Two memory regions 110, 112 are used for message frames. The IOP processor 113 writes outbound data into the message frames located in the cached host memory region 110 (mfaX0, X=1, ... N, where N=number of frames). Host software of a host 122 renders IOP transactions into the message frames located in the IOP memory regions 112 (mfaXi, X=1, ... M, where M=number of frames). During initialization, IOP hardware fills the inbound free-list FIFO 130 with the message frame addresses from the IOP region 112. Host software fills the outbound free-list FIFO 134 with the addresses from the cached host memory region 110.

Figure 2:
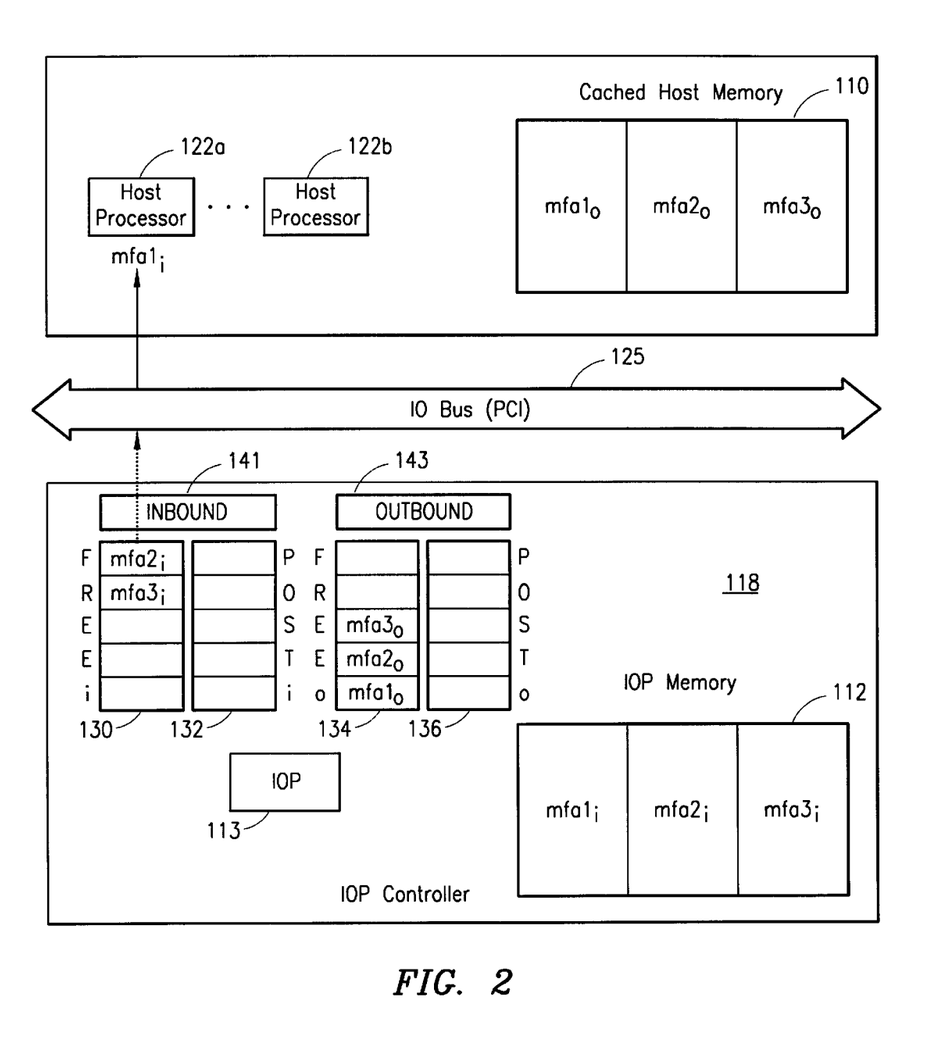
FIG. 2 is a block diagram showing the allocation of an inbound message frame address (MFA)

FIG. 2 illustrates the step of allocating an available message frame. The software of one of the hosts 122 removes the next available message frame, in this example, mfa1i, from the inbound free-list FIFO 130.

Figure 3:
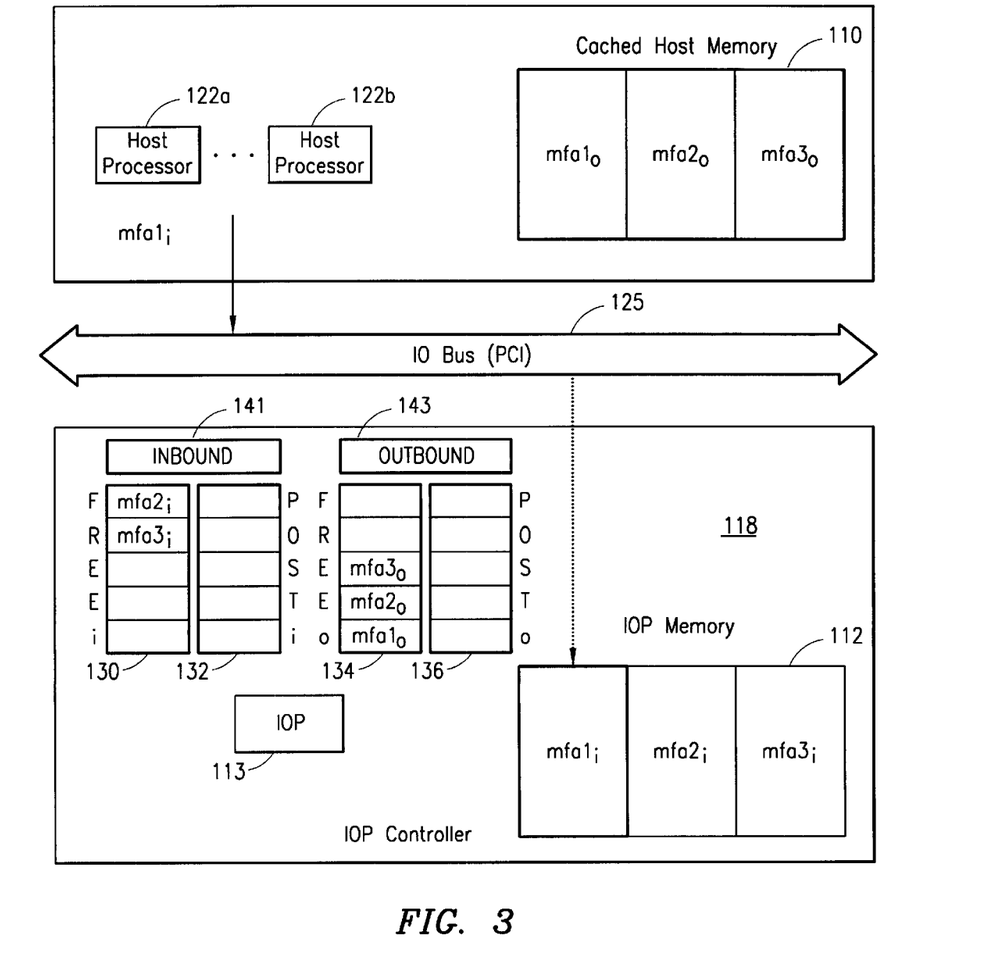
FIG. 3 is a block diagram showing the rendering (or building) of a transaction corresponding to the inbound MFA.

FIG. 3 shows the step of building (or rendering) a transaction message. In this example, one of the hosts 122 transmits data over the bus 125 which fills the message frame mfa1 of the IOP memory 112.

Figure 4:
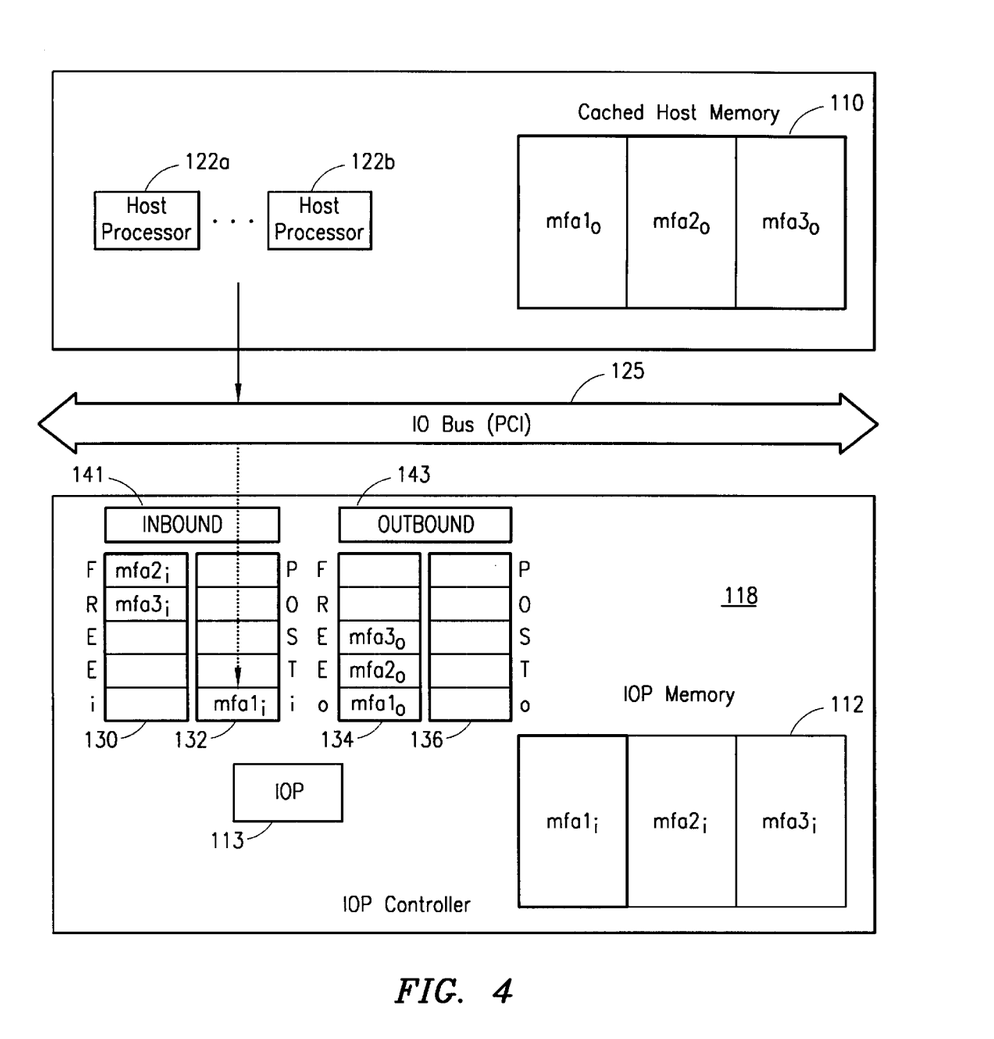
FIG. 4 is a block diagram showing the sending of the inbound MFA to the IOP controller.

FIG. 4 shows the state of the IOP controller 118 after host software of be a host 122 sends the message frame to the IOP controller 118. After the host 122 finishes building the transaction in the message frame, the message frame address, mfa1, is issued by the host 122 to the IOP controller 118 by writing the message to the inbound post-list FIFO 132. This tells the IOP controller 118 where to look in the IOP memory region 112 for the requested transaction.

Figure 5:
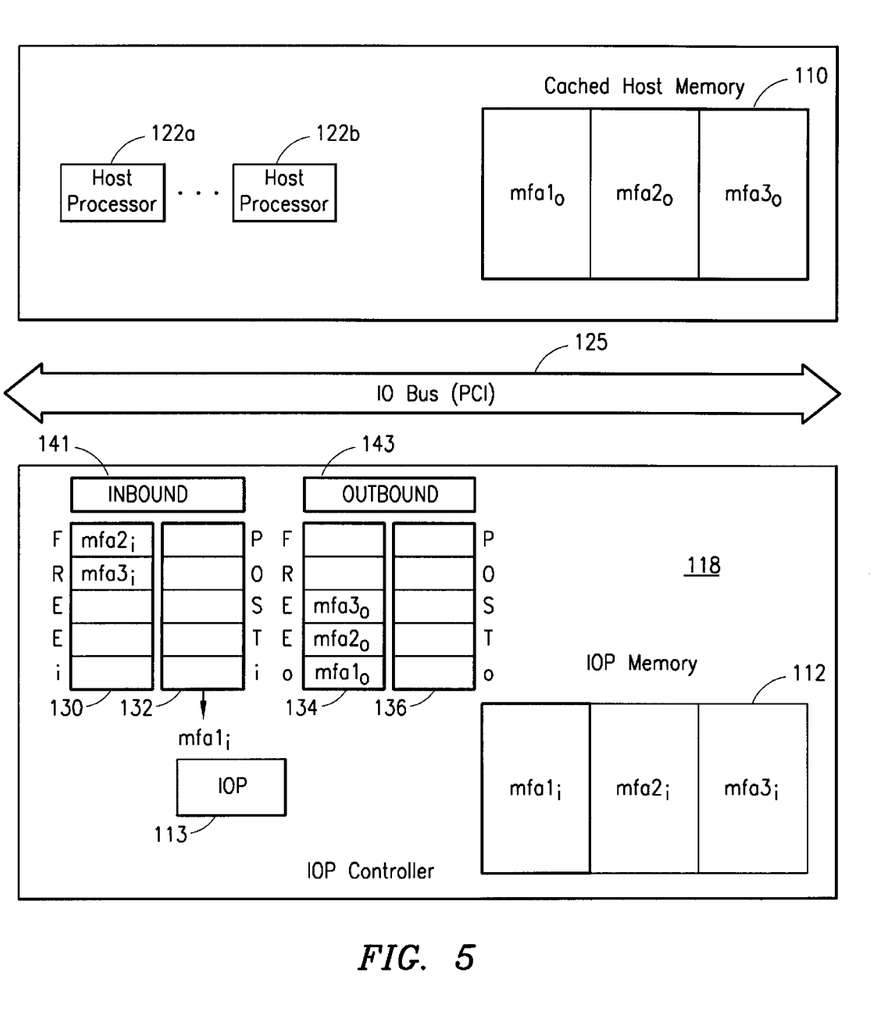
FIG. 5 is a block diagram showing the IOP processor receiving an inbound MFA and processing the message.

FIG. 5 illustrates the IOP processor 113 reading the inbound post-list FIFO 132 to obtain the message frame address of the message frame that contains the next transaction.

Figure 6:
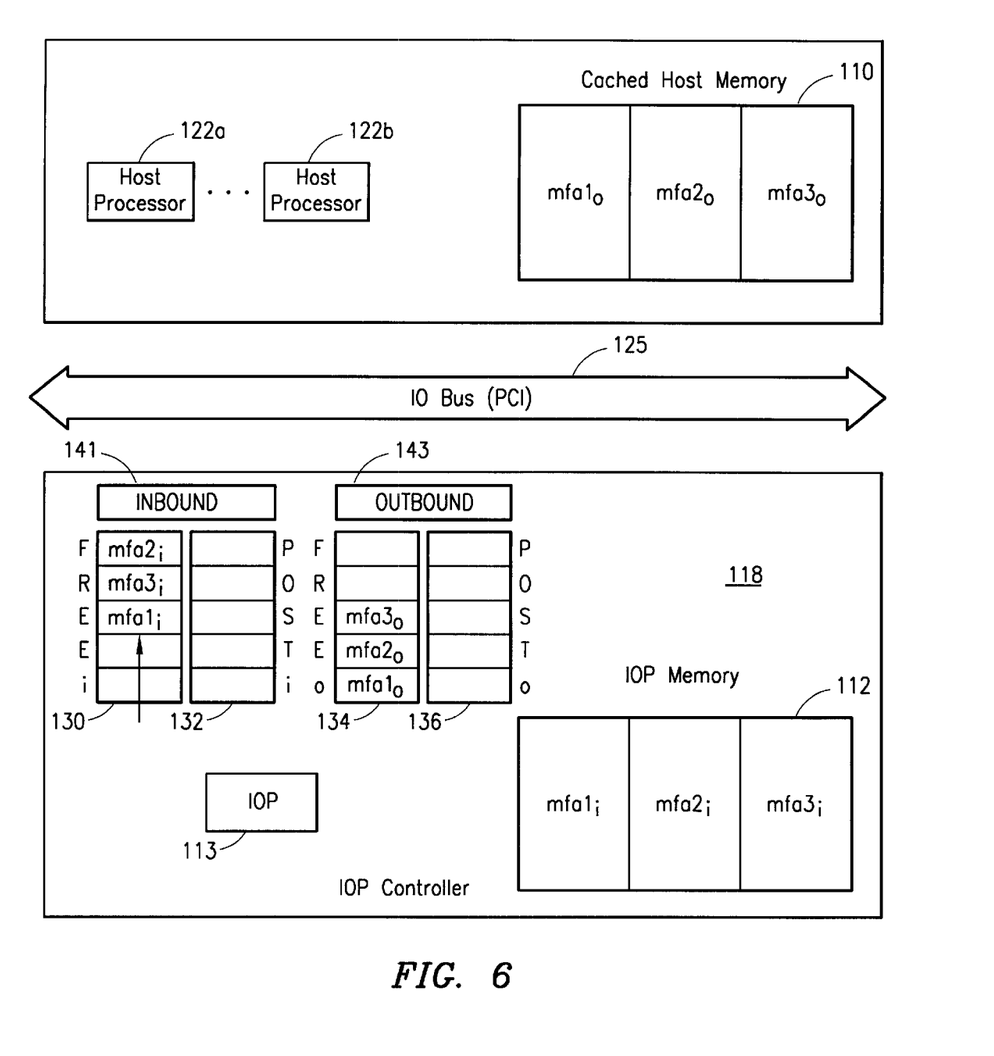
FIG. 6 is a block diagram showing the IOP processor returning the inbound MFA to the inbound free buffer.

In FIG. 6, the IOP processor 113 places the message frame mfa1 onto the inbound free-list FIFO 130 after the IOP processor 113 has finished extracting the transaction information from the frame mfa1.

Referring to FIGS. 7–11, the outbound transfer of data from the IOP processor 113 to any one of the hosts 122 is now explained.

Figure 7:
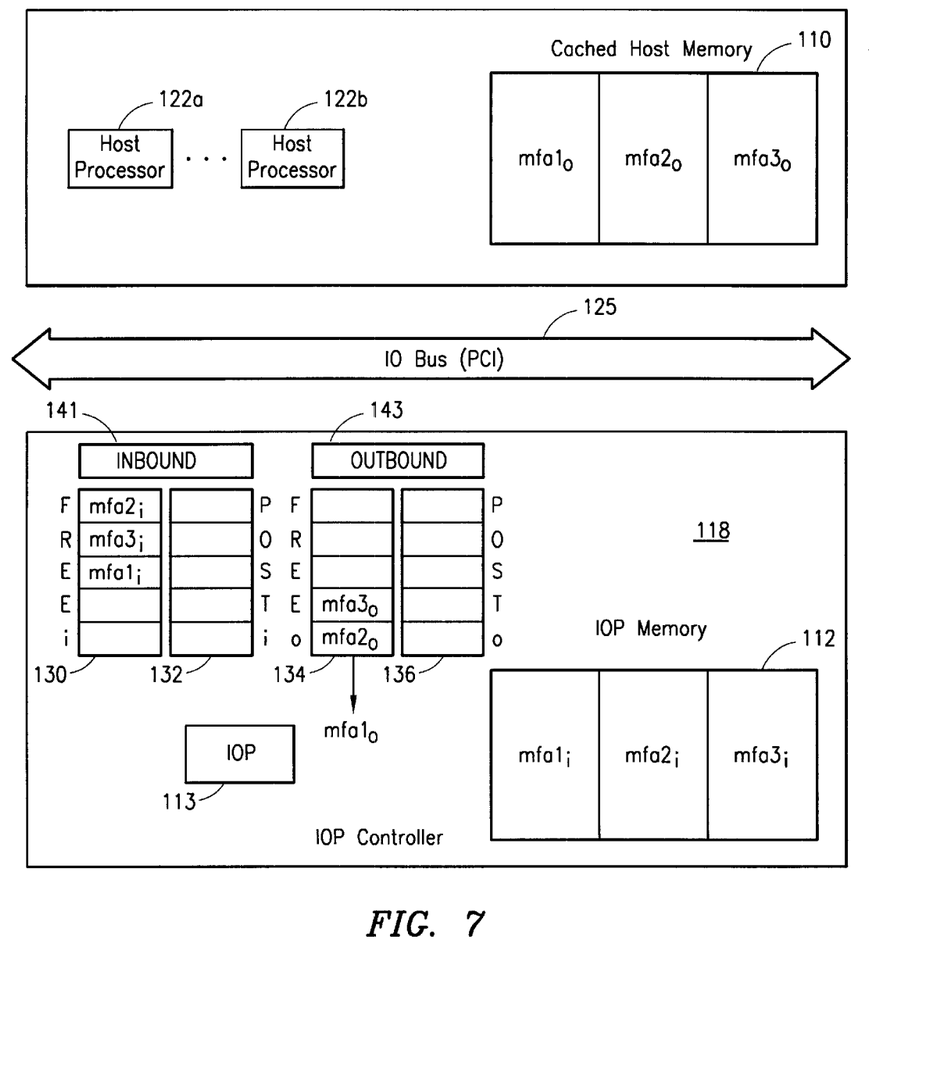
FIG. 7 is a block diagram showing the allocation of an outbound MFA.

FIG. 7 illustrates the allocation of an outbound message frame. Once the IOP controller 118 finishes processing the requested transaction, it may be necessary for a response message to be sent back to the host. The IOP processor 113 builds a completion response by allocating an available outbound message frame from the outbound free-list FIFO 134. FIG. 7 shows the state of the IOP after the IOP processor 113 removes the next available message frame from the outbound free-list FIFO 134.

Figure 8:
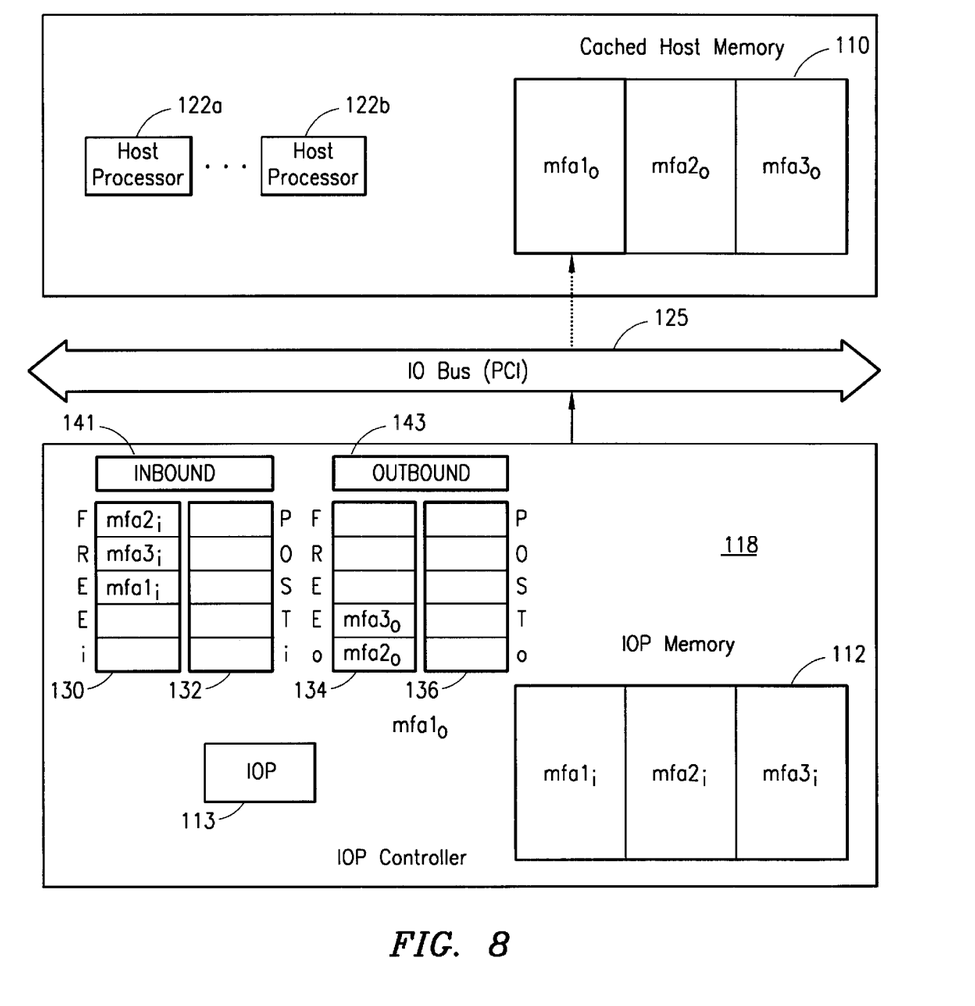
FIG. 8 is a block diagram showing the rendering (or building) of a transaction corresponding to the outbound MFA.

As shown in FIG. 8, the next step is to build a response transaction. The IOP processor 113 writes the response data to the message frame located in the cached host memory region 110. It is important to note that although the data has been written to the specified outbound message frame, the message frame has not yet been delivered to the host. FIG. 8 illustrates the IOP processor 113 rendering the response data to the outbound message frame.

Figure 9:
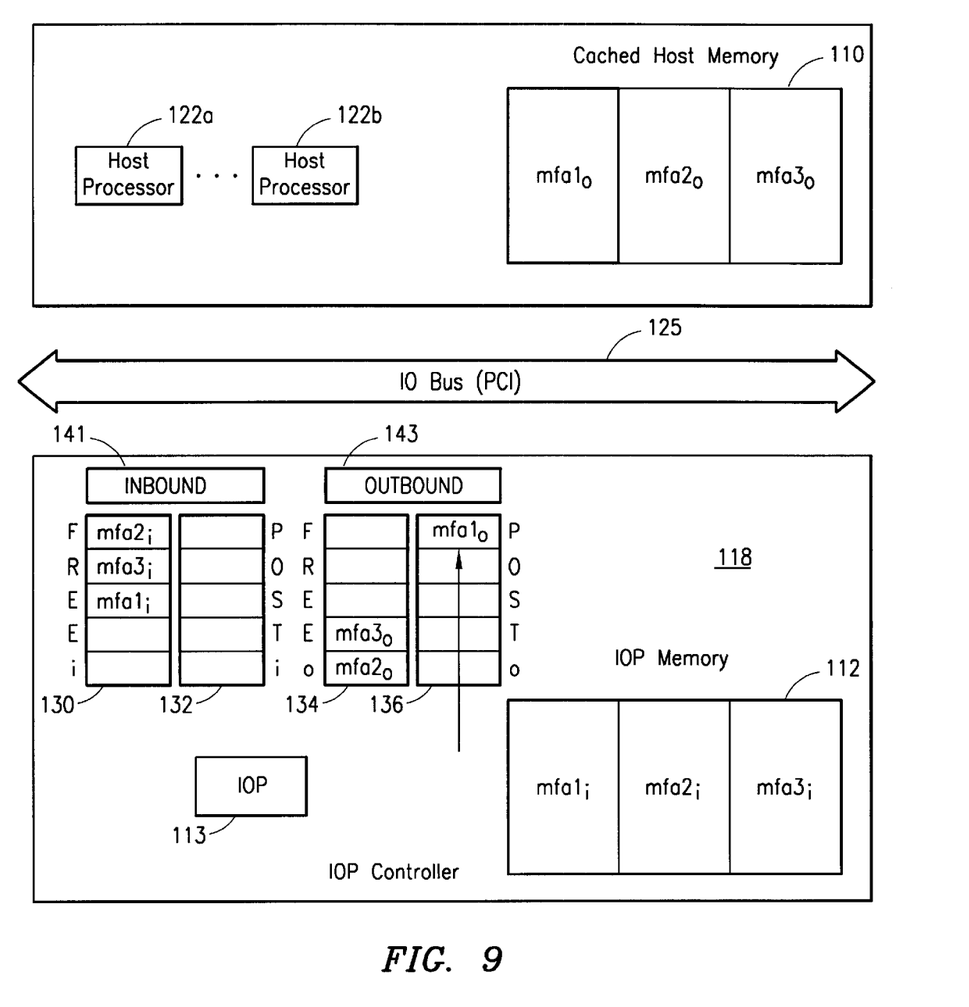
FIG. 9 is a block diagram showing the IOP Processor posting the outbound MFA.

As shown in FIG. 9, the next step is sending the message frame to the host 122. Once the IOP processor 113 finishes rendering the response data to the specified outbound message frame located in host memory 110, the IOP processor 113 must send the message frame address to the host 122 by writing the message frame address to the outbound post-list FIFO 136. This process may also incorporate an interrupt assertion mechanism to "alert" the host environment that something has been placed into the outbound post-list FIFO 136. FIG. 9 illustrates the IOP processor 113 sending the message frame address to the host 122.

Figure 10:
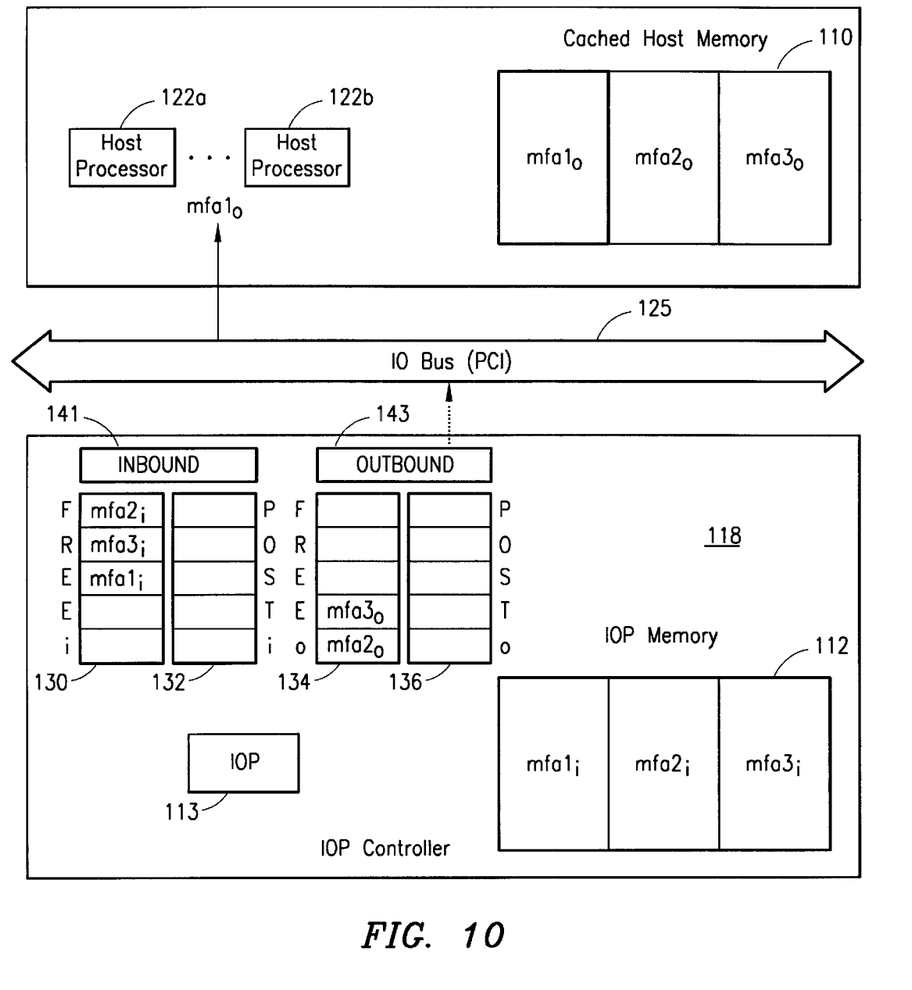
FIG. 10 is a block diagram showing a host receiving the outbound MFA and processing the message.
Figure 11:
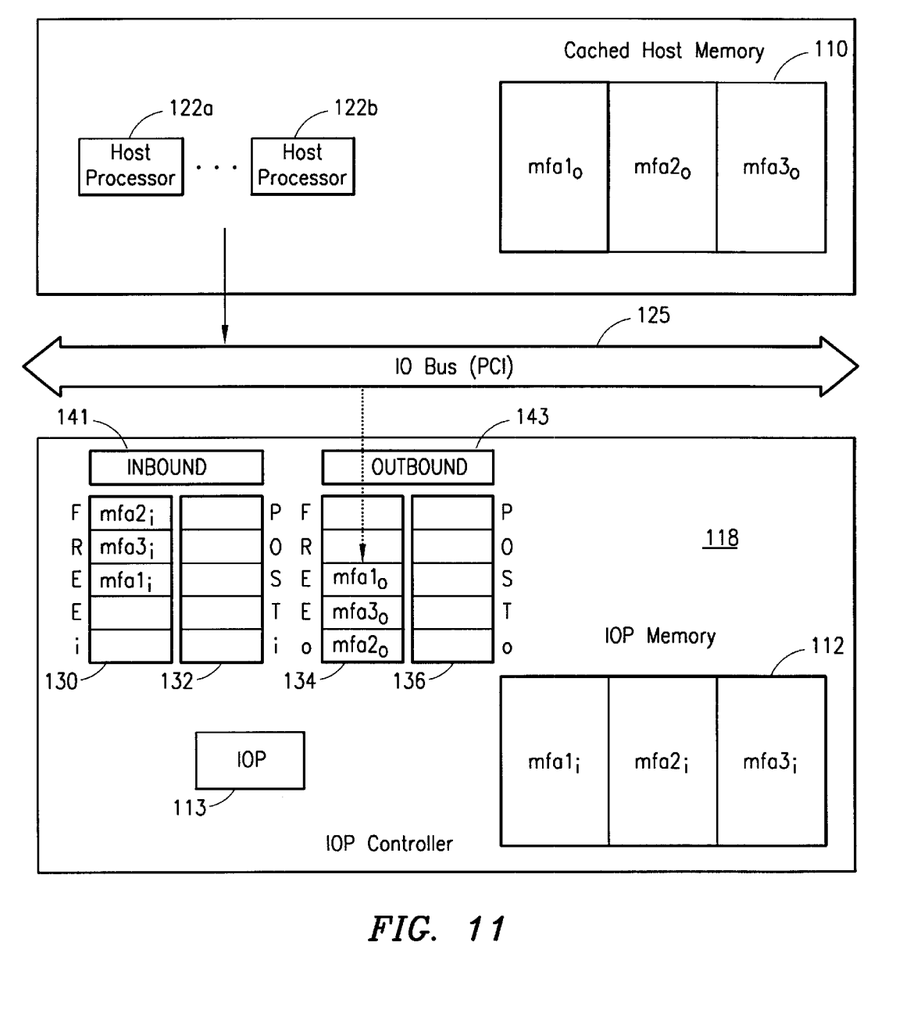
FIG. 11 is a block diagram showing the host returning the outbound MFA to the outbound free buffer.

FIG. 10 shows the host 122 receiving the outbound message frame. Host software of a host 122 can poll the outbound post-list FIFO 136 or field an interrupt event from the IOP controller 118 to receive the outbound message frame address. For either case, host software must perform an I/O read operation from the outbound post-list FIFO 136 to receive the next message frame to service. As shown in FIG. 11, after the host software of the host 122 finishes with the message frame for the response, it places the message frame back onto the outbound free-list FIFO 134.

Figure 12:
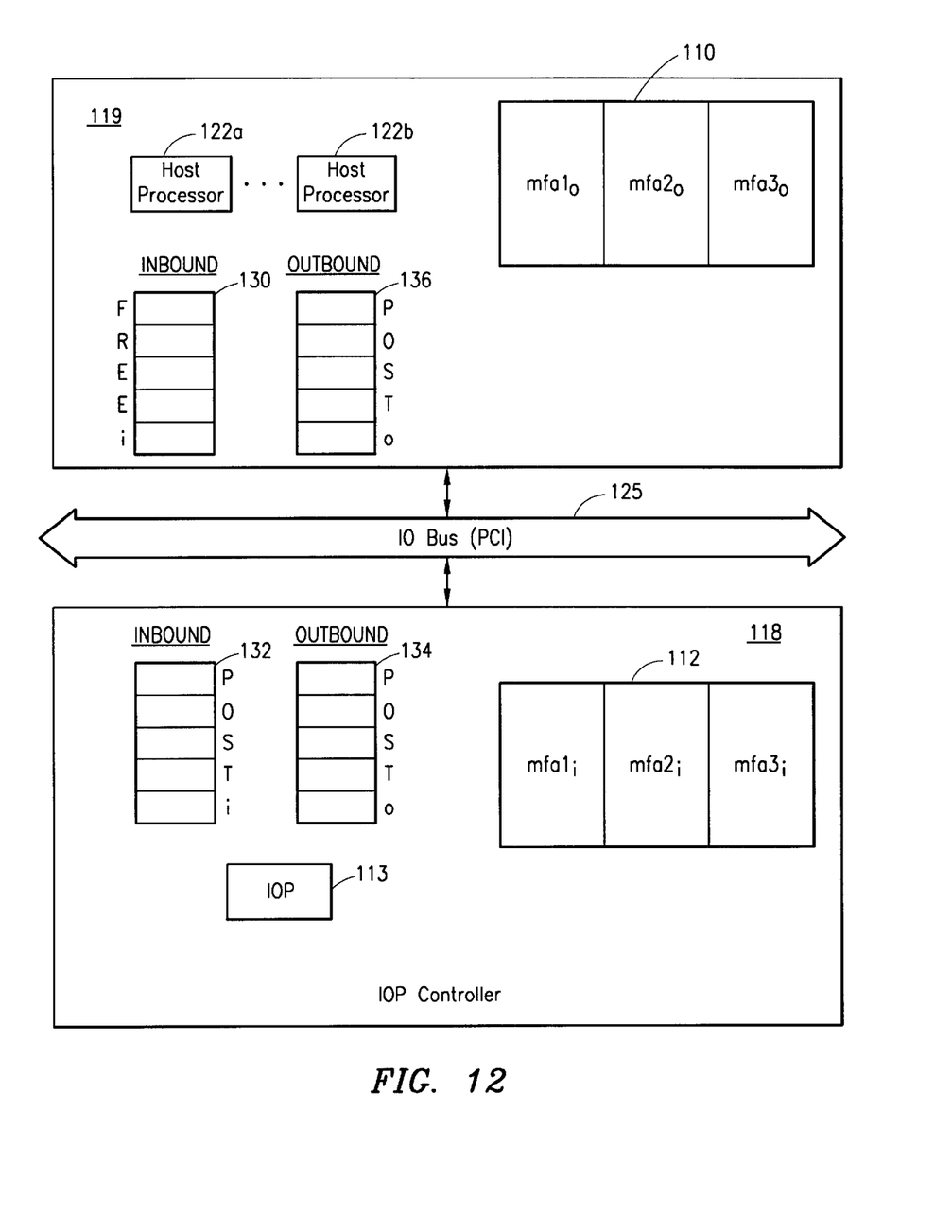
FIG. 12 is a block diagram showing an embodiment of a computer system for rendering data between host processors and IO devices according to the present invention.

Referring to FIG. 12, a block diagram of an exemplary embodiment of a computer system is provided in accordance with the teachings of the present invention. Preferably, the present invention is used in an I₂O environment. However, the present invention is not limited to an I₂O environment.

In FIG. 12, a computer system 119 in accordance with the present invention includes one or more computer hosts 122 sharing a cached host memory 110, an I/O PCI Bus 125, and an IOP Controller 118. Preferably, the one or more computer hosts 122 and the cached host memory 110 are disposed on a host bus 111 (not shown in FIG. 12, but shown in FIG. 1A). The IOP Controller 118 includes an IOP processor 113, and an IOP memory 112. The IOP memory 112 is divided into one or more message frames, (e.g. mfa1$i$, mfa2$i$, mfa3$i$). The host computer memory 110 is divided into one or more message frames (e.g., mfa10, mfa20, mfa30). There are a pair of inbound queues 130, 132 designated as an inbound queue structure, and a pair of outbound queues 134, 136 designated as an outbound queue structure. The inbound queue structure may be implemented as a pair of hardware first-in-first-out (FIFO) structures, called the free-list and post-list respectively, for allocating and posting messages to the IOP processor 113. The outbound message queue may also be implemented as a second pair of FIFOs for messages to be sent to the IOP processor 113. By comparing the present invention of FIG. 12, to computer system of FIG. 1, it can be seen that the inbound free-list buffer 130 and the outbound post-list buffer 136 have been moved to the host computer side of the I/O BUS. Preferably, the inbound free-list buffer 130 and the outbound post-list buffer 136 are included within the cached host memory 110.

The inbound and outbound transfer of data for the present invention of FIG. 12 is similar to that of the current method of FIGS. 1–11 with the modification that transfer of a message frame address (MFA) from the inbound free queue 130 to host 122 and the transfer of an MFA from the outbound post queue 136 to one of the hosts 122 as shown in FIG. 10 may now be accomplished locally without using the I/O bus. Thus, the new method of the present invention eliminates the I/O bus read transactions to allocate an inbound MFA and to receive a posted outbound MFA.

The inbound transfer of data operation may be summarized as follows. One of the hosts 122 (e.g., 122$a$ or 122$b$) reads an inbound message frame address from the free-list buffer 130 over the host bus 111 (see FIG. 1A). Alternately, the inbound free-list buffer 130 and the outbound post-list buffer 136 may be maintained within the main memory 110. The host 122 renders the data over the I/O bus 125 to the message frame location of IOP memory 112 corresponding the inbound message frame address. The host 122 writes the message frame address to the inbound post-list buffer 132 over the I/O bus 125. The Input/Output processor 113 then reads the message frame address from the inbound post-list buffer 132. The Input/Output processor 113 then transfers data corresponding to the message frame address to peripheral devices associated with the Input/Output Processor 113. After the transfer of data, the Input/Output Processor 113 writes the message frame address to the inbound free-list buffer 130 over the I/O bus 125.

The outbound transfer of data operation may be summarized as follows. The Input/Output processor 113 reads an outbound message frame address from the outbound free-list buffer 134. The Input/Output processor 113 renders data over the I/O bus 125 to the location of the cached host memory 110 corresponding the outbound message frame address. The Input/Output processor 113 writes the message frame address to the outbound post-list buffer 136 over the I/O bus 125. The host 122 reads the message frame address from the outbound post-list buffer 136 over the local host bus 111. The host 122 then processes the data of the message frame corresponding to the message frame address. The host 122 then writes the message frame address back onto to the outbound free-list buffer 134 over the I/O bus 125. Thus, in the above-described embodiment of the present invention, eliminating of reads from the I/O bus is achieved.

The free lists and the post lists are managed using concurrent non-blocking queuing techniques. One such technique is described in patent application entitled "Method and Apparatus for Selectively Incrementing Count Numbers Associated with Node Address in Concurrent Non-Blocking Queues" filed Oct. 15, 1998, Ser. No. 09/152,728, which is incorporated herein by reference.

Although only certain embodiments of the apparatus of the present invention have been illustrated in the accompanying Drawings and described in the foregoing Detailed Description, it will be understood that the invention is not limited to the embodiments disclosed, but is capable of additional rearrangements, modifications and substitutions without departing from the spirit of the invention as set forth and defined by the following claims. Accordingly, it should be understood that the scope of the present invention encompasses all such arrangements and is solely limited by the claims as follows.

What is claimed is:

1. A computer system, comprising:
    an inbound queue structure for receiving message information from a host;
    an outbound queue structure for sending message information from an I/O processor to the host, wherein each of said structures comprises a pair designated as a free-list buffer and a post-list buffer; and
    an I/O bus disposed between the host and the I/O processor, wherein the free-list buffer of the inbound queue structure and the post-list buffer of the outbound queue structure are locally coupled to the host so that the message information transfers between the free-list buffer of the inbound queue structure and the host without using the I/O bus and between the post-list buffer of the outbound queue structure and the host without using the I/O bus.

2. The computer system of claim 1, further comprising:

a host bus; and wherein the free-list buffer of the inbound queue structure and the post-list buffer of the outbound queue structure are locally coupled to the host via the host bus.

3. The computer system of claim 1, further comprising:

a cached host memory coupled to the host; and wherein the free-list buffer of the inbound queue structure and the post-list buffer of the outbound queue structure are in the cached host memory.

4. The computer system of claim 1, wherein each of the pair of buffers is a first-in-first-out (FIFO) buffer.

5. The computer system of claim 1, wherein the inbound queue structure and the outbound queue structure are adapted for use in an Intelligent Input/Output (I$_2$O) environment.

6. The computer system of claim 1, wherein the buffers of the input queue structure and the buffers of the outbound queue structure are concurrent and non-blocking.

7. The computer system of claim 1, wherein the I/O bus is a PCI bus.

8. A method for inbound transfer of information in a computer system including one or more hosts coupled via a host bus to each other and a cached host memory, an Input/Output processor coupled to an IOP memory providing data to peripheral devices, an I/O bus disposed between the hosts and the Input/Output processor for transfer of information therebetween, an inbound free-list buffer and an outbound post-list buffer coupled to the one or more hosts via only a host bus, and an inbound post-list buffer and outbound free-list buffer coupled locally to the Input/Output processor, said method transferring information from one of the hosts to one of the peripheral devices, comprising the act of:

reading by one of the hosts an inbound message frame address from the inbound free-list buffer over only the host bus.

9. The method of claim 8, further comprising the steps of:

rendering over the I/O bus data by one of the hosts to the location of the IOP memory corresponding to the inbound message frame address;

writing the message frame address by the host to the inbound post-list buffer over the I/O bus;

reading by the Input/Output Processor the message frame address from the inbound post-list buffer;

transferring by the Input/Output Processor data corresponding to the message frame address in the IOP memory to peripheral devices associated with the Input/Output Processor; and writing the message frame address by the Input/Output processor to the inbound free-list buffer over the I/O bus.

10. The method of claim 8, wherein the inbound free-list buffer and the outbound post-list buffer are located in the cached host memory.

11. A method for outbound transfer of information in a computer system including a plurality of hosts coupled via a host bus to each other and a cached host memory, an Input/Output processor providing data to peripheral devices and an I/O bus disposed between the hosts and the Input/Output processor for transfer of information therebetween, an inbound free-list buffer and an outbound post-list buffer coupled to one of the hosts via a host bus, and an inbound post-list buffer and outbound free-list buffer coupled locally to the Input/Output processor, said method transferring information from the I/O processor to one of the hosts, comprising the steps of:

reading by the Input/Output processor a message frame address from the outbound free-list buffer;

rendering over the I/O bus data by the Input/Output processor to the location of the cached host memory corresponding the message frame address;

writing the message frame address by the Input/Output processor to the outbound post-list buffer over the I/O bus;

reading by the host the message frame address from the outbound post-list buffer via the host bus and without utilizing the I/O bus;

processing the transferred data by the host; and writing the message frame address by the host to the outbound free-list buffer over the I/O bus.

12. A method for providing concurrent non-blocking transaction queuing in a computer system comprising one or more host processors coupled locally to a main memory communicating with an Input/Output Processor (IOP) over an I/O Bus, an inbound queue structure for receiving messages from a host, an outbound queue structure for receiving messages from a host, an outbound queue structure for sending messages from a local I/O processor, wherein each of said structures comprises a pair of first-in-first-out (FIFO) buffers, designated as a free-list buffer and a post-list buffer, wherein the free-list buffer of the inbound queue structure are coupled to the host via a host bust comprising the acts of:

allocating an inbound message frame by transferring over the host bus and not transferring over the I/O bus the inbound message frame address from the free-list buffer of the inbound queue to one of the host processors.

13. A computer system comprising:

one or more host computers;

a cached host memory;

a cached host bus coupling the host computers to the cached host memory;

an Input/Output processor;

an Input/Output memory coupled to the Input/Output processor;

an I/O bus disposed between the host computers and the Input/Output processor forming a communications pathway therebetween;

an inbound free-list buffer locally coupled to the host computers; and an outbound post-list buffer locally coupled to the host computers.

14. The system of claim 13, wherein the inbound free-list buffer and the outbound post-list buffer are coupled to the host computers via the host bus.

15. The system of claim 13, wherein the inbound free-list buffer and the outbound post-list buffer are maintained in the cached host memory locally coupled to the host via the host bus.

16. The system of claim 13, further comprising:

an inbound post-list buffer; and and outbound free-list buffer, wherein the inbound post-list buffer and outbound free-list buffer are maintained in the Input/Output memory.

* * * * *